(12) United States Patent
Kaneda et al.

(10) Patent No.: US 9,120,706 B2
(45) Date of Patent: Sep. 1, 2015

(54) METHOD FOR PRODUCING SILICON CARBIDE CERAMIC AND METHOD FOR PRODUCING HONEYCOMB STRUCTURE

(71) Applicant: NGK INSULATORS, LTD., Nagoya (JP)

(72) Inventors: Atsushi Kaneda, Nagoya (JP); Takayuki Inoue, Nagoya (JP); Tsuyoshi Watanabe, Nogoya (JP)

(73) Assignee: NGK Insulators, Ltd., Nagoya (JP)

( * ) Notice: Subject to any disclaimer, the term of this patent is extended or adjusted under 35 U.S.C. 154(b) by 180 days.

(21) Appl. No.: 13/852,022

(22) Filed: Mar. 28, 2013

(65) Prior Publication Data

US 2013/0207322 A1 Aug. 15, 2013

Related U.S. Application Data

(63) Continuation of application No. PCT/JP2011/072438, filed on Sep. 29, 2011.

(30) Foreign Application Priority Data

Sep. 29, 2010 (JP) ................................. 2010-219510

(51) Int. Cl.
*C04B 35/565* (2006.01)
*C04B 35/573* (2006.01)
(Continued)

(52) U.S. Cl.
CPC ............... *C04B 35/573* (2013.01); *B01J 35/04* (2013.01); *C04B 35/565* (2013.01); *C04B 38/0006* (2013.01); *B01D 2255/9155* (2013.01); *C04B 2111/0081* (2013.01);
(Continued)

(58) Field of Classification Search
CPC ................ C04B 35/573; C04B 35/565; C04B 2235/3826; C04B 2235/3834; C04B 2235/383
See application file for complete search history.

(56) References Cited

U.S. PATENT DOCUMENTS 4,777,152 A * 10/1988 Tsukada .......................... 501/80
5,322,824 A 6/1994 Chia
(Continued)

FOREIGN PATENT DOCUMENTS

EP 0 771 770 A2 5/1997
EP 2 623 482 A1 8/2013
(Continued)

OTHER PUBLICATIONS

Extended European Search Report (Application No. 11829305.9) dated Mar. 28, 2014.
(Continued)

*Primary Examiner* — Erin Snelting
(74) *Attorney, Agent, or Firm* — Burr & Brown, PLLC

(57) ABSTRACT

Provided is a method for producing a silicon carbide ceramic easily and simply producing a silicon carbide ceramic having a small amount in resistivity change due to temperature change and being capable of generating heat by current application; and having a forming raw material preparing step of mixing two or more kinds of silicon carbide ceramic powders containing 4H—SiC silicon carbide crystals at respectively different content ratio to prepare a forming raw material; a forming step of forming the forming raw material into a formed body; and a firing step of firing the formed body to produce a silicon carbide ceramic being adjusted at a content ratio of 4H—SiC silicon carbide crystal to a desired value.

17 Claims, 1 Drawing Sheet

(51) Int. Cl.
    *B01J 35/04* (2006.01)
    *C04B 38/00* (2006.01)
    *C04B 111/00* (2006.01)
(52) U.S. Cl.
    CPC ........ *C04B 2111/00793* (2013.01); *C04B 2235/3826* (2013.01); *C04B 2235/3834* (2013.01); *C04B 2235/428* (2013.01); *C04B 2235/5436* (2013.01); *C04B 2235/80* (2013.01); *C04B 2235/9607* (2013.01)

(56) References Cited

U.S. PATENT DOCUMENTS

| 2006/0222812 | A1 | 10/2006 | Koyama et al. | |
| 2007/0001349 | A1* | 1/2007 | Muroi et al. | 264/605 |
| 2009/0011179 | A1 | 1/2009 | Kikuchi et al. | |
| 2009/0155528 | A1 | 6/2009 | Kawai | |

FOREIGN PATENT DOCUMENTS

| JP | 61-000423 | A1 | 1/1986 |
| JP | 07-053265 | A1 | 2/1995 |
| JP | 07-089764 | A1 | 4/1995 |
| JP | 10-045476 | A1 | 2/1998 |
| JP | 2009-143763 | A1 | 7/2009 |
| WO | 03/016238 | A2 | 2/2003 |
| WO | 2006/112052 | A1 | 10/2006 |
| WO | 2007/119287 | A1 | 10/2007 |

OTHER PUBLICATIONS

International Search Report and Written Opinion dated Nov. 15, 2011.

European Office Action, European Application No. 11 829 305.9, dated Jan. 19, 2015 (6 pages).

* cited by examiner

METHOD FOR PRODUCING SILICON CARBIDE CERAMIC AND METHOD FOR PRODUCING HONEYCOMB STRUCTURE

BACKGROUND OF THE INVENTION

1. Field of the Invention

The present invention relates to a method for producing a silicon carbide ceramic and a method for producing a honeycomb structure. More specifically, the present invention relates to a method for producing a silicon carbide ceramic capable of easily producing a silicon carbide ceramic having a small amount of resistivity change due to temperature change and being capable of generating heat by current application. Further, the present invention relates to a method for producing a honeycomb structure by using such a method for producing a silicon carbide ceramic.

2. Description of Related Art

Silicon carbide is a compound semiconductor with good conductivity and has an excellent thermal resistance and chemical stability. Therefore, silicon carbide has been utilized as a current application heating element to be used in high-temperature electric furnaces and the like. Generally, silicon carbide exhibits the behavior that "the resistivity rapidly decreases and it converts to increase at about 400° C. as a minimal" with a temperature increase due to current application heat generation. This has been considered on the basis that silicon carbide is a semiconductor. That is, since silicon carbide is a semiconductor, the number of conduction electrons capable of being excited from an impurity level to a conduction band increases with a temperature increase. The resistivity decreases within a range of from normal temperature to about 400° C. by this behavior. At temperatures exceeding about 400° C., since the mobility of conduction electrons increases due to thermal vibration of lattice, it has been considered that the resistivity exhibits a slightly increasing tendency.

Thus, the silicon carbide exhibits the negative property that the resistivity change depending on temperature is a negative (property of showing a decrease in resistivity with a temperature increase) within a range of from normal temperature to about 400° C. Therefore, there were following problems in the case of using silicon carbide as a heating element and increasing the temperature from the normal temperature to about 400° C. by current application. That is, the resistivity of the silicon carbide (heating element) decreases with the above-mentioned temperature increase, and this may make an electric current increase rapidly. In addition, it is very difficult for a heating element exhibiting a large change rate in the above-mentioned "resistivity change depending on temperature" {100×(magnitude of a change in resistivity)/(magnitude of a temperature change)} to control the temperature.

In contrast to this, there is proposed a method for producing a silicon carbide heating element being made of a "silicon carbide sintered body containing at least 10% of β-SiC crystal particles and having nitrogen dissolved therein" in attempt to reducing a resistivity change depending on temperature (see, for example, Patent Document 1). There has been also proposed a method for producing a conductive silicon carbide ceramic material composed mainly of "silicon carbide containing 90% or less of 6H—SiC silicon carbide crystals with respect to the entire crystal system and having nitrogen dissolved therein" and having a predetermined temperature coefficient of resistance (see, for example, Patent Document 2).

RELATED ART DOCUMENTS

Patent Documents

Patent Document 1: JP-A-H07-89764
Patent Document 2: JP-A-H07-53265

SUMMARY OF THE INVENTION

The silicon carbide heating element obtained by the method for producing a silicon carbide heating element disclosed in Patent Document 1 contains at least 10% of β-SiC (3C—SiC) crystal particles being a metastable phase. Since there is a possibility of the 3C—SiC silicon carbide crystals being transformed into 4H—SiC or 6H—SiC due to thermal history when a current application is performed at a high voltage, the silicon carbide heating element obtained by the above method may have deteriorated thermal resistance due to such transformation.

Moreover, the conductive silicon carbide ceramic materials obtained by the method for producing a conductive silicon carbide ceramic material disclosed in Patent Document 2 have a small temperature dependence of electric resistance. However, the resistivity at normal temperature of each of the conductive silicon carbide ceramic materials obtained by this method is as small as 1 Ω·cm or less. Therefore, a current may flow excessively through these conductive silicon carbide ceramic materials when a current application is performed at a high voltage, and thereby, it may damage electric circuits and the like so that they are not preferred.

The present invention has been made in view of such problems of the related art. The present invention provides a method for easily producing a silicon carbide ceramic having a small amount of resistivity due to temperature change and being capable of generating heat by current application. In addition, the present invention provides a method for producing a honeycomb structure by using such a method for producing a silicon carbide ceramic.

According to the present invention, the method for producing a silicon carbide ceramic and the method for producing a honeycomb structure as shown below are provided.

[1] A method for producing a silicon carbide ceramic having a forming raw material preparing step of mixing a plural kinds of silicon carbide ceramic powders containing 4H—SiC silicon carbide crystals at respectively different content ratio to prepare a forming raw material; a forming step of forming the forming raw material to form a formed body; and a firing step of firing the formed body to produce a silicon carbide ceramic being adjusted at a content ratio of a 4H—SiC silicon carbide crystal to a desired value.

[2] A method for producing a silicon carbide ceramic according to [1], wherein the plural kinds of silicon carbide ceramic powders are composed of low 4H—SiC silicon carbide ceramic powders being silicon carbide ceramic powders having a smaller content ratio of 4H—SiC silicon carbide crystal compared with the content ratio of 4H—SiC silicon carbide crystals in silicon carbide crystals in a silicon carbide ceramic to be produced and high 4H—SiC silicon carbide ceramic powders being silicon carbide ceramic powders having a larger content ratio of 4H—SiC silicon carbide crystal compared with the content ratio of 4H—SiC silicon carbide crystals in the silicon carbide crystals in the silicon carbide ceramic to be produced; wherein the content ratio of the 4H—SiC silicon carbide crystals in the silicon carbide crystals in the low 4H—SiC silicon carbide ceramic powders is 0.01 to 15 mass %, and the content ratio of the 4H—SiC silicon carbide crystals in the silicon carbide crystals in the high 4H—SiC silicon carbide ceramic powders is 0.5 to 40 mass %.

[3] A method for producing a silicon carbide ceramic according to [2], wherein a difference between the content ratio of the 4H—SiC silicon carbide crystals in the silicon carbide crystals in the low 4H—SiC silicon carbide ceramic powders and the content ratio of the 4H—SiC silicon carbide crystals in the silicon carbide crystals in the high 4H—SiC silicon carbide ceramic powders is 5 to 30 mass %.

[4] A method for producing a silicon carbide ceramic according to any one of [1] to [3], wherein the silicon carbide ceramic to be produced contains 0.1 to 25 mass % of 4H—SiC silicon carbide crystals and 50 to 99.9 mass % of 6H—SiC silicon carbide crystals in the silicon carbide crystals.

[5] A method for producing a silicon carbide ceramic according to any one of [1] to [4], wherein a content amount of a nitrogen in the silicon carbide ceramic to be produced is 0.01 mass % or less.

[6] A method for producing a silicon carbide ceramic according to any one of [1] to [5], wherein the forming raw material metal silicon powders are contained in the forming raw material; and the silicon carbide ceramic to be produced contains a plurality of silicon carbide particles and silicon for binding the silicon carbide particles to each other.

[7] A method for producing a silicon carbide ceramic according to [6], wherein an average particle diameter of the silicon carbide particles is 10 to 50 μm.

[8] A method for producing a silicon carbide ceramic according to any one of [1] to [7], wherein a porosity of the silicon carbide ceramic to be produced is 30 to 65%.

[9] A method for producing a honeycomb structure which prepares a honeycomb structure being a honeycomb structural silicon carbide ceramic by a method for producing a silicon carbide ceramic according to any one of [1] to [8].

The method for producing a silicon carbide ceramic of the present invention has a forming raw material preparing step of mixing a plural kinds of silicon carbide ceramic powders "containing 4H—SiC silicon carbide crystals at respectively different content ratio" to prepare a forming raw material. Therefore, according to the method for producing a silicon carbide ceramic of the present invention, it is possible to produce a silicon carbide ceramic having a small amount of resistivity change due to temperature change and being capable of generating heat by current application.

According to the method for producing a honeycomb structure of the present invention, since a honeycomb structure is produced by using the method of producing a silicon carbide ceramic of the present invention, it is possible to produce a honeycomb structure having a small amount of resistivity change due to temperature change and being capable of generating heat by current application.

DETAILED DESCRIPTION OF THE INVENTION

Figure 1:
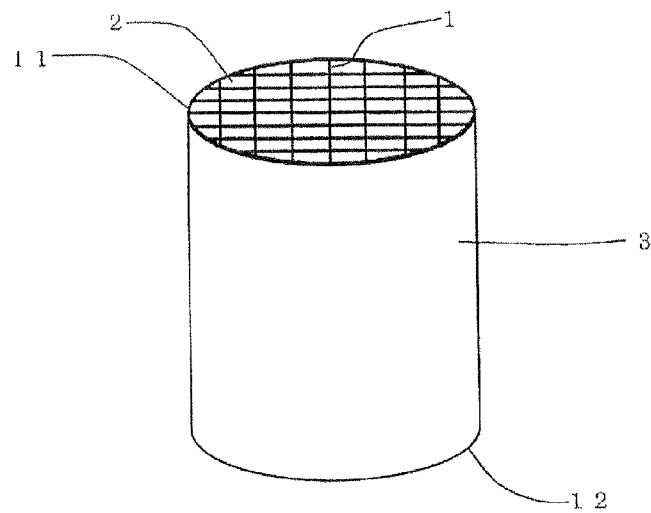
FIG. 1 is a perspective view schematically showing one embodiment of a honeycomb structure produced by one embodiment of a method for producing a honeycomb structure of the present invention.

Hereinafter, the embodiments of the present invention will be described, but the invention is not limited to or by the following embodiments. It should be understood that modifications, improvements and the like suitably added to the following embodiments based on the ordinary knowledge of a person skilled in the art without departing from the scope of the present invention are also included in the scope of the present invention.

(1) Method for Producing a Silicon Carbide Ceramic:

(1-1) One embodiment of a method for producing a silicon carbide ceramic of the present invention is a method including a forming raw material preparing step, a forming step, and a firing step. The forming raw material preparing step is a step of mixing a plural kinds of silicon carbide ceramic powders "containing 4H—SiC silicon carbide crystals at respectively different content ratio" to prepare a forming raw material. The forming step is a step of forming the forming raw material to form a formed body. The firing step is a step of firing the formed body to produce a silicon carbide ceramic being adjusted at a content ratio of 4H—SiC silicon carbide crystal to a desired value. The content ratio of silicon carbide in the silicon carbide ceramic powders to be used for the preparation of the forming raw material is preferably 60 mass % or more. In addition, the content ratio of silicon (metal silicon) in the silicon carbide ceramic powders to be used for the preparation of the forming raw material is preferably 40 mass % or less. The term "a plural kinds" of the "a plural kinds of silicon carbide ceramic powders" as used herein means "a plural kinds" when silicon carbide ceramic powders are classified (distinguished) by the "content amount of 4H—SiC silicon carbide crystals contained therein". In other words, the silicon carbide ceramic powders different in the content amount of 4H—SiC silicon carbide crystals are regarded as different kinds of silicon carbide ceramic powders. And the term "a plural kinds of silicon carbide ceramic powders" means a plural number of "silicon carbide ceramic powders respectively different in the content amount of 4H—SiC silicon carbide crystals".

By the method for producing a silicon carbide ceramic of the present invention, it is possible to obtain a silicon carbide ceramic having a desired content ratio of the 4H—SiC silicon carbide crystal in the silicon carbide crystals. That is, firstly, a plural kinds of predetermined silicon carbide ceramic powders (which have different content ratios of the 4H—SiC silicon carbide crystals, respectively) are prepared. And, only by mixing them at a predetermined ratio, it is possible to adjust the content ratio of 4H—SiC silicon carbide crystals in the silicon carbide crystals of the resulting silicon carbide ceramic to a desired value. The number of the kinds of the silicon carbide ceramic powders to be mixed is preferably 2 to 5, more preferably 2.

The content ratio of 4H—SiC silicon carbide crystals in the silicon carbide ceramic in the forming raw material is adjusted so that the content ratio of 4H—SiC silicon carbide crystals in the silicon carbide ceramic to be produced becomes a desired value. Incidentally, unless otherwise specifically indicated, the term "content ratio of 4H—SiC silicon carbide crystals" means a content ratio of 4H—SiC silicon carbide crystals with respect to the entire silicon carbide crystals in the silicon carbide ceramic (or silicon carbide ceramic powders).

Silicon carbide ceramic powders having a "content ratio of 4H—SiC silicon carbide crystals" smaller than the "desired content ratio of 4H—SiC silicon carbide crystals" are called "low 4H—SiC silicon carbide ceramic powders" or "low 4H—SiC silicon carbide powders". In addition, silicon carbide ceramic powders having a "content ratio of 4H—SiC silicon carbide crystals" larger than the "desired content ratio of 4H—SiC silicon carbide crystals" are called "high 4H—SiC silicon carbide ceramic powders" or "high 4H—SiC silicon carbide powders". The plural kinds of silicon carbide ceramic powders "containing 4H—SiC silicon carbide crystals at respectively different content ratio" are composed of "low 4H—SiC silicon carbide ceramic powders" and "high 4H—SiC silicon carbide ceramic powders". The number of the kinds of the "low 4H—SiC silicon carbide ceramic powders" constituting the plural kinds of the silicon carbide ceramic powders "containing 4H—SiC silicon carbide crystals at respectively different content ratio" may be either one or more. In addition, the number of the kinds of the "high 4H—SiC silicon carbide ceramic powders" constituting the plural kinds of the silicon carbide ceramic powders "containing 4H—SiC silicon carbide crystals at respectively different content ratio" may be either one or more. The term "desired content ratio of 4H—SiC silicon carbide crystals" as used herein means the content ratio of 4H—SiC silicon carbide crystals in the silicon carbide crystals in the "silicon carbide ceramic to be produced (desired silicon carbide ceramic)"® Moreover, the term "content ratio of 4H—SiC silicon carbide crystals" in the silicon carbide ceramic powders means a content ratio of 4H—SiC silicon carbide crystals with respect to the entire silicon carbide crystals in the silicon carbide ceramic powders.

The content ratio of 4H—SiC silicon carbide crystals in the silicon carbide crystals in the "low 4H—SiC silicon carbide ceramic powders" is preferably 0.01 to 15 mass %. And, the content ratio of 4H—SiC silicon carbide crystals in the silicon carbide crystals in the "high 4H—SiC silicon carbide ceramic powders" is preferably 0.5 to 40 mass %. It is to be noted that the term "content ratio of 4H—SiC silicon carbide crystals in the silicon carbide crystals" means the content ratio of 4H—SiC silicon carbide crystals with respect to the entire silicon carbide crystals in the silicon carbide ceramic powders.

The "content ratio of 4H—SiC silicon carbide crystals in the silicon carbide crystals in the low 4H—SiC silicon carbide ceramic powders" is called a "content ratio of 4H—SiC silicon carbide crystals in the low 4H—SiC silicon carbide powders". The "content ratio of 4H—SiC silicon carbide crystals in the silicon carbide crystals in the high 4H—SiC silicon carbide ceramic powders" is called a "content ratio of 4H—SiC silicon carbide crystals in the high 4H—SiC silicon carbide powders". A difference between the "content ratio of 4H—SiC silicon carbide crystals in the low 4H—SiC silicon carbide powders" and the content ratio of 4H—SiC silicon carbide crystals in the high 4H—SiC silicon carbide powders" is preferably 5 to 30 mass %. And, this difference is more preferably 7 to 30 mass %, particularly preferably 15 to 27 mass %. When the difference is smaller than 5 mass %, it may be difficult to prepare the raw materials at the time of adjusting the content ratio of 4H—SiC silicon carbide crystals in the silicon carbide crystals of a silicon carbide ceramic to be obtained to a desired value. When the difference is more than 30 mass %, since the resistance decreases in a part, there is a possibility of being an even temperature distribution. When either one or both of the low 4H—SiC silicon carbide powders and the high 4H—SiC silicon carbide powders are present in a plural kinds, it preferably satisfies the following condition. That is, it is preferable that a difference between the "content ratio of 4H—SiC silicon carbide crystals in the low 4H—SiC silicon carbide powders" and the "content ratio of 4H—SiC silicon carbide crystals in the high 4H—SiC silicon carbide powders" becomes within the above-described range even if any one of the ones among the plural kinds is selected.

In addition, in the silicon carbide crystals in the low 4H—SiC silicon, carbide ceramic powders, 6H—SiC silicon carbide crystals are preferably contained mainly, in addition to the 4H—SiC silicon carbide crystals. The term "6H—SiC silicon carbide crystals are contained mainly, in addition to the 4H—SiC silicon carbide crystals" means that except trace components being 1 mass % or less, only 6H—SiC silicon carbide crystals are contained, in addition to the 4H—SiC silicon carbide crystals. In addition, similarly, in the silicon carbide crystals in the high 4H—SiC silicon carbide ceramic powders, 6H—SiC silicon carbide crystals are preferably contained mainly, in addition to the 4H—SiC silicon carbide crystals.

Moreover, in the silicon carbide crystals in the low 4H—SiC silicon carbide ceramic powders, 15R—SiC silicon carbide crystals or 3C—SiC silicon carbide crystals may be contained, in addition to the 4H—SiC silicon carbide crystals and 6H—SiC silicon carbide crystals. In addition, similarly, in the silicon carbide crystals in the high 4H—SiC silicon carbide ceramic powders, 15R—SiC silicon carbide crystals or 3C—SiC silicon carbide crystals may be contained, in addition to the 4H—SiC silicon carbide crystals and 6H—SiC silicon carbide crystals.

When a silicon carbide ceramic containing 15R—SiC silicon carbide crystals is produced, it is preferable that the 15R—SiC silicon carbide crystals are contained in either one of the low 4H—SiC silicon carbide ceramic powders or the high 4H—SiC silicon carbide ceramic powders or "both of them". The term "both of them" means "both of the low 4H—SiC silicon carbide ceramic powders and the high 4H—SiC silicon carbide ceramic powders.

Examples of the structure of silicon carbide crystals include "hexagonal 2H—SiC, 4H—SiC, and 6H—SiC structures", "cubic 3C—SiC structure", and "rhombohedral 15R—SiC structure". These crystal structures are typically present in (throughout) silicon carbide crystals as a mixture and "an amount of resistivity change due to temperature change (a resistivity change depending on temperature)" differs with the kind of the crystal structure.

The method for producing a silicon carbide ceramic according to the present embodiment is described more specifically. The shape of a silicon carbide ceramic produced by the method for producing a silicon carbide ceramic according to the present embodiment is not particularly limited. In the following description on the method for producing, a method for producing a honeycomb structural silicon carbide ceramic (honeycomb structure) is described. The method for producing a honeycomb structure being a honeycomb structural silicon carbide ceramic by the method for producing a silicon carbide ceramic of the present invention is a method for producing a honeycomb structure of the present invention. Therefore, the following description on the method for producing a silicon carbide ceramic according to the present embodiment is also a description on one embodiment of the method for producing a honeycomb structure of the present invention. Incidentally, examples of the shape of the silicon carbide ceramic to be produced by the method for producing a silicon carbide ceramic according to the present embodiment include, in addition to a honeycomb shape, a columnar shape, a plate shape, and an amorphous shape. The silicon carbide ceramic to be produced by the method for producing a silicon carbide ceramic according to the present embodiment has any shape insofar as the shape can be formed by a forming method of a ceramic such as extrusion.

(1-2) When a silicon carbide ceramic (silicon-silicon carbide ceramic) "containing a plurality of silicon carbide particles and silicon (metal silicon:Si) for binding these silicon carbide particles to each other" is produced, it is preferred to produce the silicon carbide ceramic by using the following method.

Firstly, a plural kinds of silicon carbide ceramic powders "containing 4H—SiC silicon carbide crystals at respectively different content ratio" are mixed to prepare a forming raw material (a forming raw material preparing step). More specifically, low 4H—SiC silicon carbide ceramic powders and high 4H—SiC silicon carbide ceramic powders are mixed so as to adjust the "content ratio of the 4H—SiC silicon carbide crystals in the silicon carbide crystals of a silicon carbide ceramic to be produced" to a desired value. Further, the resulting mixture is mixed with metal silicon powders to prepare a forming raw material. At this time, if necessary, it is preferred to mix further with additives ordinarily used in the production of a silicon-silicon carbide ceramic such as binder, surfactant, pore forming material, and water. Incidentally, there is not particularly limited on the mixing order of these raw materials. Moreover, the low 4H—SiC silicon carbide ceramic powders and the high 4H—SiC silicon carbide ceramic powders may be collectively and simply called "silicon carbide ceramic raw material".

An average particle diameter of the silicon carbide ceramic raw material is preferably 10 to 50 μm, more preferably 15 to 35 μm. When the average particle diameter is smaller than 10 μm, since the resistivity tends to become high easily, an electric current flows hardly at the time of current application so that it may be difficult to generate heat sufficiently. When the average particle diameter is larger than 50 μm, since the porosity tends to become low easily, the thermal capacity tends to increase so that the temperature elevating rate during current application may become slow. An average particle diameter of the silicon carbide ceramic raw material is a value of a 50% particle size measured by a laser diffraction/scattering particle size distribution analyzer (for example, "LA-920", product of Horiba, Ltd.) using the Fraunhofer diffraction theory or Mie scattering theory as a measurement principle.

The total of the content ratio of the metal silicon and that of the silicon carbide ceramic raw material in the forming raw material is preferably 30 to 90 mass %.

A ratio (mass ratio) of the metal silicon in the forming raw material with respect to the total of the metal silicon and the silicon carbide ceramic raw material is preferably 10 to 40 mass %, more preferably 15 to 35 mass %.

Examples of the binder include methyl cellulose, hydroxypropylmethyl cellulose, hydroxypropoxyl cellulose, hydroxyethyl cellulose, carboxymethyl cellulose, and polyvinyl alcohol. Of these, it is preferable that methyl cellulose is used in combination with hydroxypropoxyl cellulose. The content amount of the binder is preferably 2.0 to 10.0 parts by mass based on 100 parts by mass of the total mass of the silicon carbide ceramic raw material and the metal silicon.

The content amount of water is preferably 20 to 60 parts by mass based on 100 parts by mass of the total mass of the silicon carbide ceramic raw material and the metal silicon.

Examples of the surfactant include ethylene glycol, dextrin, fatty acid soap, and polyalcohol. These surfactants may be used either singly or in combination. The content amount of the surfactant is preferably 0.1 to 2.0 parts by mass based on 100 parts by mass of the total mass of the silicon carbide ceramic raw material and the metal silicon.

The pore forming material is not particularly limited insofar as it forms pore after firing, and examples thereof include graphite, starch, resin balloon, water absorbing resin, and silica gel. The content amount of the pore forming material is preferably 0.5 to 10.0 parts by mass based on 100 parts by mass of the total mass of the silicon carbide ceramic raw material and the metal silicon. The average particle diameter of the pore forming material is preferably 10 to 30 μm. When the average particle diameter is smaller than 10 μm, it may not form pore sufficiently. When the average particle diameter is larger than 30 μm, it may be clogged at a die during forming. The average particle diameter of the pore forming material is a value measured by using a laser diffraction method.

Next, the forming raw material is kneaded to form a kneaded clay. There is not particularly limited on the method for kneading the forming raw material to form a kneaded clay, and examples thereof include a method using a kneader or a vacuum kneader machine.

Next, it is preferred to extrude the kneaded clay (forming raw material) to form a honeycomb formed body (formed body with honeycomb shape) (forming step). The honeycomb formed body (formed body with honeycomb shape) is a cylindrical formed body having porous partition walls defining "a plurality of cells each extending from the one end face to another end face" to form a through channel of a fluid; and an outer peripheral wall located at the most outer periphery. Incidentally, the honeycomb formed body is not necessarily equipped with an outer peripheral wall. It is to be noted that in the method for producing a silicon carbide ceramic of the present invention, the shape of the formed body formed at the forming step is not limited as a honeycomb shape, and it may be any shape.

In extrusion, it is preferred to use a die having a desired entire shape (external shape), a cell shape, a thickness of partition walls, a cell density, and the like. The material of the die is preferably a superalloy being hardly worn away.

The external shape, size, thickness of the partition wall, cell density, thickness of the outer peripheral wall, and the like of the honeycomb formed body can be appropriately determined depending on the structure of the honeycomb structure to be produced while considering the shrinkage during drying or firing.

The honeycomb formed body thus obtained is preferably dried. There is not particularly limited on the drying method, and examples thereof include electromagnetic wave heating methods such as microwave heating drying and high-frequency induction heating drying, and external heating methods such as hot air drying and overheat water vapor drying. Of these methods, it is preferred to dry the formed body to remove a predetermined water content by the electromagnetic wave heating method, followed by drying to remove the remaining water content by the external heating method. This makes it possible to dry the entirety of the formed body quickly and uniformly while preventing the crack generation. As drying conditions, it is preferred to remove a water content of 30 to 99 mass % with respect to the water content before drying by the electromagnetic wave heating method, and then reduce the water content to 3 mass % or less by the external heating method. As the electromagnetic wave heating method, induction heating drying is preferred, and as the external heating method, hot air drying is preferred.

When a length of the honeycomb formed body in a central axis direction is not a desired length, it is preferable that both end faces (both end portions) are cut to obtain the desired length. Although there is not particularly limited on a cutting method, examples thereof include a method using a circular saw cutter machine.

Next, it is preferred to conduct calcination for removing the binder and the like. The calcination is conducted preferably at 400 to 550° C. for 0.5 to 20 hours under the atmosphere. There is not particularly limited on the calcination method, and it can be conducted using an electric furnace, gas furnace, or the like.

Next, the honeycomb formed body subjected to calcination is fired to prepare a honeycomb structure (honeycomb structural silicon carbide ceramic) being adjusted at a content ratio of 4H—SiC silicon carbide crystals to a desired value (firing step). As the firing conditions, the firing is preferably performed at the temperature of 1400 to 1500° C. for 1 to 20 hours under an inert atmosphere such as nitrogen or argon. In addition, after the firing, oxidation treatment is preferably conducted at 1200 to 1350° C. for 1 to 10 hours in order to improve durability. There is not particularly limited on the firing method, and it can be conducted using an electric furnace, a gas furnace, or the like.

(1-3) When a silicon carbide ceramic formed by binding silicon carbides to each other (not containing silicon as a binder) is produced, it is preferred to prepare the silicon carbide ceramic by following method.

Firstly, in the forming raw material preparing step, a plural kinds of silicon carbide ceramic powders containing "4H—SiC silicon carbide crystals at respectively different content ratio" are mixed to obtain a forming raw material. And, additives are then added if necessary without adding metal silicon to obtain the forming raw material.

Moreover, when a silicon carbide ceramic containing 15R—SiC silicon carbide crystals or 3C—SiC silicon carbide crystals is prepared, it is preferred that 15R—SiC silicon carbide crystals or 3C—SiC silicon carbide crystals are contained in the low 4H—SiC silicon carbide ceramic powders or the high 4H—SiC silicon carbide ceramic powders, or in "both of them". Above term "both of them" means "both of the low 4H—SiC silicon carbide ceramic powders and high 4H—SiC silicon carbide ceramic powders".

Next, the forming raw material is formed into a desired structure such as honeycomb structure, if necessary, by extrusion or the like to form a formed body (forming step).

Then, the formed body thus obtained is fired in a known manner to obtain a silicon carbide ceramic being adjusted at a content ratio of 4H—SiC silicon carbide crystals to a desired value (firing step).

(2) Silicon Carbide Ceramic:

It is preferred that the silicon carbide ceramic produced by one embodiment of the method for producing a silicon carbide ceramic of the present invention contains silicon carbide crystals and "0.1 to 25 mass % of 4H—SiC silicon carbide crystals and 50 to 99.9 mass % of 6H—SiC silicon carbide crystals" are contained in the silicon carbide crystals.

Thus, the silicon carbide ceramic produced by the one embodiment of the method for producing a silicon carbide ceramic of the present invention contains 0.1 to 25 mass % of 4H—SiC silicon carbide crystals and 50 to 99.9 mass % of 6H—SiC silicon carbide crystals. So, the resulting silicon carbide ceramic has a small amount of resistivity change due to temperature change and is capable of generating heat by current application. Therefore, the honeycomb structure produced by the method for producing a silicon carbide ceramic according to the present embodiment can be used as a "current application heating element" generating heat by current application. Moreover, when the honeycomb structure is used as a catalyst carrier (current application heat-generating catalyst carrier) for purifying an exhaust gas by loading a catalyst thereon, this catalyst carrier (honeycomb structure) has a small change in resistivity even when the temperature changes greatly. Therefore, the catalyst carrier (honeycomb structure) can conduct the temperature control stably during current application heat generation.

The silicon carbide ceramic to be produced by one embodiment of the method for producing a silicon carbide ceramic of the present invention may hereinafter be called a "silicon carbide ceramic to be produced". In the silicon carbide ceramic to be produced, the silicon carbide crystals to be contained therein preferably contains 4H—SiC silicon carbide crystals, 6H—SiC silicon carbide crystals and 15R—SiC silicon carbide crystals, and are more preferably made of these crystals.

The content ratio of 4H—SiC silicon carbide crystals in the silicon carbide crystals in the silicon carbide ceramic to be produced is preferably 0.1 to 25 mass %, more preferably 0.1 to 17 mass %, particularly preferably 0.1 to 5 mass %. Crystal components in the silicon carbide crystals other than the 4H—SiC silicon carbide crystals are preferably 6H—SiC silicon carbide crystals and 15R—SiC silicon carbide crystals. When the content ratio of 4H—SiC silicon carbide crystals in the silicon carbide crystals is less than 0.1 mass %, electrical conduction is mainly occurred through the crystal phase of the 6H—SiC silicon carbide crystals so that an amount of resistivity change due to temperature change may increase. When the content ratio of 4H—SiC silicon carbide crystals in the silicon carbide crystals is more than 25 mass %, the resistivity decrease and an electric current may flow excessively at the time of current application so that electric circuits and the like may be damaged.

In the silicon carbide crystals in the silicon carbide ceramic to be produced, 15R—SiC silicon carbide crystals may be contained at a ratio of 0.1 to 20 mass %, more preferably 0.1 to 12 mass %. The band gap of the 15R—SiC silicon carbide crystals is smaller than that of the 4H—SiC silicon carbide crystals. Therefore, the influence on the inversion layer channel mobility due to the trap density of an oxide film in the vicinity of the interface is small. Further, since the bulk mobility of the 15R—SiC silicon carbide crystals is low anisotropy, there is a effect for stabilizing the resistance at the time of current application. On the other hand, when the content ratio of the 15R—SiC silicon carbide crystals in the silicon carbide crystals is more than 20 mass %, it may be impossible to reduce an amount of resistivity change due to temperature change because conductivity due to the 15R—SiC silicon carbide crystals is mainly occurred.

The content ratio of the 3C—SiC silicon carbide crystals in the silicon carbide crystals in the silicon carbide ceramic to be produced is preferably 5 mass % or less, more preferably 3 mass % or less. Since the 3C—SiC silicon carbide is a metastable phase, it is transformed into 4H or 6H—SiC silicon carbide due to thermal history. Therefore, when the content ratio of the 3C—SiC silicon carbide crystals in the silicon carbide crystals is more than 5 mass %, the thermal resistance may deteriorate.

When the 15R—SiC silicon carbide crystals or the 3C—SiC silicon carbide crystals, or "both of them" are contained in the silicon carbide crystals in the silicon carbide ceramic to be produced, the "remaining components" in the silicon carbide crystals are preferably 6H—SiC silicon carbide crystals. The term "both of them" means both of the 15R—SiC silicon carbide crystals and the 3C—SiC silicon carbide crystals. The term "the remaining components" means components other than "4H—SiC silicon carbide crystals, 15R—SiC silicon carbide crystals, and 3C—SiC silicon carbide crystals".

The content amount of a nitrogen (content amount of nitrogen in solid solution) in the silicon carbide ceramic to be produced by one embodiment of the method for producing a silicon carbide ceramic of the present invention is preferably 0.01 mass % or less. When the content amount of nitrogen in solid solution is more than 0.01 mass %, the resistivity decreases and an electric current may flow excessively at the time of current application to damage electric circuits and the like so that it is not preferable. The content amount of nitrogen is a value measured by using ICP (Inductively Coupled Plasma: high-frequency inductively coupled plasma) emission spectroscopic analysis.

The silicon carbide ceramic to be produced by one embodiment of a method for producing a silicon carbide ceramic of the present invention is preferably a porous fired body (sintered body). When the silicon carbide ceramic to be produced is porous, the porosity is preferably 30 to 65%, more preferably 35 to 50%. When the porosity is smaller than 30%, the resistivity decreases and an electric current may flow excessively at the time of current application to damage electric circuits and the like. Further, when the porosity is smaller than 30%, since the thermal capacity increase, a temperature elevating rate may become slow at the time of current application. When the porosity is more than 65%, since the resistivity becomes easily high and an electric current may flow hardly at the time of current application, it may be difficult to generate heat sufficiently. When the porosity is more than 65%, the strength decreases so that cracks may be generated due to "thermal cycle or temperature distribution at the time of current application". The porosity is a value measured using a mercury porosimeter. In addition, the average pore diameter is preferably 2 to 30 μm, more preferably 4 to 20 μm. When the average pore diameter is smaller than 2 μm, the resistivity may become high excessively. When the average pore diameter is larger than 30 μm, the resistivity may become small extremely. The average pore diameter is a value measured by using a mercury porosimeter.

The silicon carbide ceramic to be produced is 2 to 100 Ω·cm of a resistivity at 20° C. ($R_{20}$) and preferably 1 to 25 Ω·cm of a resistivity at 400° C., more preferably 5 to 20 Ω·cm. This makes it possible to cause the silicon carbide ceramic to be produced to generate heat properly by current application. When the resistivity at 400° C. is larger than 25 Ω·cm, since an electric current hardly flows at the time of current application, it may be difficult to generate heat sufficiently. When the resistivity at 400° C. is smaller than 1 Ω·cm, an electric current flows excessively at the time of current application to damage electric circuits and the like. It is to be noted that the resistivity at 400° C. is a value obtained by elevating the temperature of the silicon carbide ceramic to 400° C. by current application heat generation.

Moreover, in the silicon carbide ceramic to be produced, a difference ($R_{20}-R_{Min}$) between the resistivity at 20° C. ($R_{20}$) and the minimum resistivity ($R_{Min}$) is preferably 80 Ω·cm or less, more preferably 40 Ω·cm or less. In this way, when a difference between the resistivity at 20° C. and the minimum resistivity is small, since a change in resistivity due to current application heat generation decreases at the time of current application, it is possible to prevent an electric current from flowing excessively. When the difference of the resistivity is more than 80 Ω·cm, an electric current may flow excessively at the time of current application to damage electric circuits and the like. The term "minimum resistivity" as used herein means a value in which the resistivity of the silicon carbide ceramic reaches the minimum value when a temperature of the silicon carbide ceramic is changed.

Moreover, in the silicon carbide ceramic to be produced, the temperature ($T_{R-Min}$) at which the resistivity reaches the minimum value (minimum resistivity) is preferably 500° C. or less, more preferably 400° C. or less. By converting the resistivity to increase at a lower temperature, it is possible to avoid an electric current from flowing excessively to prevent the damage of electric circuits and the like.

When the silicon carbide ceramic to be produced contains "a plurality of silicon carbide particles and silicon for binding these silicon carbide particles to each other", it is possible to further decrease the resistivity. In addition, in this case, the content ratio of silicon is preferably 10 to 40 mass %, more preferably 15 to 35 mass %. When the content ratio of silicon is less than 10 mass %, the porosity becomes high and the resistivity may tend to become high easily. And thereby, since an electric current becomes to hardly flow when current application is performed at the silicon carbide ceramic to be prepared, it may be difficult to generate heat sufficiently. Further, when the content ratio of silicon is less than 10 mass %, the strength decreases so that cracks may be generated due to thermal cycle or temperature distribution during current application. When the content ratio of silicon is more than 40 mass %, the porosity becomes low and the resistivity may become low easily. And thereby, an electric current flows excessively when current application is performed at the silicon carbide ceramic to be prepared to damage the electric circuits and the like. Further, when the content ratio of silicon is more than 40 mass %, thermal capacity increases so that a temperature elevating rate during current application may become slow.

Moreover, when the silicon carbide ceramic to be produced contains "a plurality of silicon carbide particles and silicon for binding these silicon carbide particles to each other", an average particle diameter of silicon carbide particles is preferably 10 to 50 μm, more preferably 15 to 35 μm. By adjusting the average particle diameter of the silicon carbide particles within such a range, it is possible to support a small amount of resistivity change due to temperature change and a desired resistivity at the same time. When the average particle diameter of the silicon carbide particles is smaller than 10 μm, the resistivity tends to become high easily. And thereby, since an electric current becomes to hardly flow when current application is performed at the silicon carbide ceramic to be prepared, it may be difficult to generate heat sufficiently. When an average particle diameter of the silicon carbide particles is larger than 50 μm, the porosity tends to become high. And thereby, since the thermal capacity tends to become high easily, a temperature elevating rate may become slowly when current application is performed at the silicon carbide ceramic to be prepared. The average particle diameter of the silicon carbide particles contained in the silicon carbide ceramic is a value determined by observing the cross-section and surface of the silicon carbide ceramic with SEM and analyzing them by an image processing software. As the image processing software, ImageJ (product of NIH (National Institute of Health)) can be used. Specifically, for example, a sample for observing the "cross-section" and "surface" is cut out from a silicon carbide ceramic firstly. With regard to the cross-section of the silicon carbide ceramic, the asperities of the cross-section are filled with a resin, followed by polishing, and then the cross-section thus polished is observed. On the other hand, with regard to the surface of the silicon carbide ceramic, the sample (partition wall) cut out therefrom is used for observation. An arithmetic average of the observation results of five fields of view for the "cross-section" and five fields of view for the "surface" is designated as an average particle diameter of the silicon carbide particles contained in the silicon carbide ceramic.

When a voltage of, for example, 100 to 800V is applied to the silicon carbide ceramic produced by one embodiment of the method for producing a silicon carbide ceramic of the present invention, it becomes 400 to 900° C. due to heat generation.

(3) Method for Producing a Honeycomb Structure:

The one embodiment of the method for producing a honeycomb structure of the present invention is a method of producing a honeycomb structure being a "honeycomb structural silicon carbide ceramic" by one embodiment of the method for producing a silicon carbide ceramic of the present invention. The term "honeycomb structure" as used herein means a cylindrical structure having porous partition walls defining "a plurality of cells extending from one end face to another end face" to form a through channel of a fluid and an outer peripheral wall located at the most outer periphery.

The method for producing a honeycomb structure according to the present embodiment is a method of forming a honeycomb structural formed body in the forming step of one embodiment of the method for producing a silicon carbide ceramic of the present invention. The method for producing a honeycomb structure in the present embodiment is preferably similar to the above-mentioned one embodiment of the method for producing a silicon carbide ceramic of the present invention except that the "honeycomb structural formed body" is formed in the forming step. In the forming step, there is not particularly limited on the method of forming the forming raw material into the "honeycomb structural formed body", and a known method can be employed.

Figure 2:
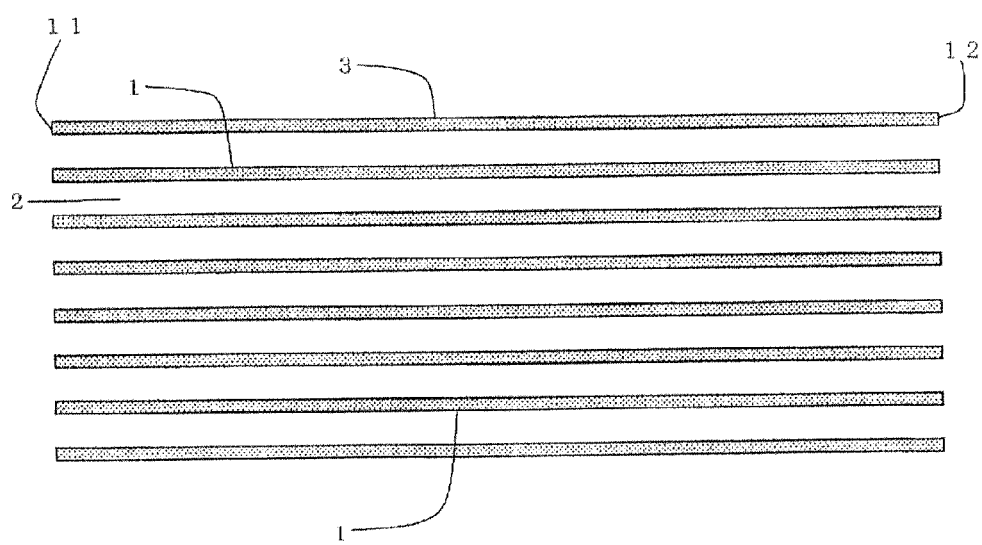
FIG. 2 is a schematic view showing the cross-section, which is parallel to a cell extending direction, of a honeycomb structure produced by one embodiment of a method for producing a honeycomb structure of the present invention.

(4) Honeycomb Structure:

As shown in FIGS. 1 and 2, a "honeycomb structure" 100 is a cylindrical structure having porous partition walls 1 defining "a plurality of cells 2 extending from one end face 11 to another end face 12" to form a through channel of a fluid and an outer peripheral wall 3 located at the most outer periphery. Incidentally, the honeycomb structure thus produced is not necessarily equipped with the outer peripheral wall. The honeycomb structure 100 is a honeycomb structure produced by one embodiment of the method for producing a honeycomb structure of the present invention.

Thus, the honeycomb structure 100 is one making the shape of a formed body to honeycomb shape in one embodiment of the method for producing a silicon carbide ceramic of the present invention. So, the honeycomb structure 100 has a small amount of resistivity change due to temperature change and is capable of generating heat by current application. Therefore, when the honeycomb structure 100 is used as a catalyst carrier for purifying an exhaust gas by loading a catalyst thereon, the catalyst carrier becomes the one having a small change in resistivity even if the temperature changes largely. Therefore, it is possible for the catalyst carrier to conduct the temperature control stably during current application heat generation.

In the honeycomb structure 100, a thickness of the partition walls is preferably 50 to 200 μm, more preferably 70 to 130 μm. By adjusting the thickness of the partition walls within such a range, even if a catalyst is loaded the honeycomb structure 100 while using it as a catalyst carrier, it is possible to suppress an excessive increase in pressure loss when an exhaust gas flowed into. When the thickness of the partition walls is thinner than 50 μm, the strength of the resulting honeycomb structure may decrease. When the thicknesses of the partition walls is thicker than 200 μm, a pressure loss may increase in the case of loading a catalyst on the honeycomb structure 100 while using it as a catalyst carrier.

In the honeycomb structure 100, a cell density is preferably 40 to 150 cells/cm$^2$, more preferably 70 to 100 cells/cm$^2$. By adjusting the cell density within such a range, it is possible to improve the purifying performance of the catalyst at a state that a pressure loss is lower when an exhaust gas is flowed into. When the cell density is smaller than 40 cells/cm$^2$, a catalyst loading area may decrease. When the cell density is more than 150 cells/cm$^2$, the pressure loss at the time of flowing an exhaust gas into may increase in the case of loading a catalyst on the honeycomb structure 100 while using it as a catalyst carrier.

The partition walls 1 are preferably porous. When the partition walls 1 are porous, the porosity of the partition walls 1 is preferably 30 to 65%, more preferably 35 to 50%. When the porosity is smaller than 30%, thermal capacity becomes large so that a temperature elevating rate may become slow at the time of current application. When the porosity is larger than 65%, the strength decreases so that cracks may be generated due to a thermal cycle or temperature distribution at the time of current application.

Moreover, when the partition walls 1 are porous, an average pore diameter of the partition walls 1 is preferably 2 to 30 μm, more preferably 4 to 20 μm. When the average pore diameter is smaller than 2 μm, the resistivity may become high excessively. When the average pore diameter is larger than 30 μm, the resistivity may become low extremely.

Moreover, the thickness of the outer peripheral wall 3 constituting the most outer periphery of the honeycomb structure 100 is preferably 0.1 to 2 mm. When the thickness is thinner than 0.1 mm, the strength of the honeycomb structure 100 may deteriorate. When the thicknesses is thicker than 2 mm, an area of the partition walls for loading a catalyst may decrease.

In the honeycomb structure 100, the cross-sectional shape of the cell 2 perpendicular to the extending direction of the cell 2 is preferably rectangular, hexagonal, or octagonal, or combination thereof. When the shape of the cell makes such a shape, since the pressure loss decreases at the time that an exhaust gas is flowed into the honeycomb structure 100, the purifying performance of a catalyst exhibits excellent.

There is not particularly limited on the shape of the honeycomb structure 100. The shape of the honeycomb structure 100 is, for example, a cylindrical shape with a circumferentially round bottom (cylindrical), a cylindrical shape with a circumferentially oval bottom, or a cylindrical shape with a circumferentially polygonal bottom (such as rectangular, pentagonal, hexagonal, heptagonal, or octagonal). Moreover, with regard to the size of the honeycomb structure, the area of the whole bottom surface is preferably 2000 to 20000 mm$^2$, more preferably 4000 to 10000 mm$^2$. In addition, the length in the central axis direction of the honeycomb structure is preferably 50 to 200 mm, more preferably 75 to 150 mm.

An isostatic strength of the honeycomb structure 100 is preferably 1 MPa or more, more preferably 3 MPa or more. Although the isostatic strength is preferably more, the upper limit is about 10 MPa in consideration of the material, structure, and the like of the honeycomb structure 100. When the isostatic strength is less than 1 MPa, the honeycomb structure may be easily broken in the case of using it as a catalyst carrier or the like. The isostatic strength is a value measured by applying a hydrostatic pressure thereon in water.

(5) Current Applying Heat-Generating Catalyst Carrier:

The honeycomb structure produced by one embodiment of the method for producing a honeycomb structure of the present invention can be used as an current applying heat-generating catalyst carrier. The term "current applying heat-generating catalyst carrier" means a "catalyst carrier" generating heat due to current applying (by applying an electric current).

When the honeycomb structure produced by one embodiment of the method for producing a honeycomb structure of the present invention is used as a current application heat-generating catalyst carrier, the amount of resistivity change due to temperature change is small and it is possible to generate heat by current application. Therefore, when the current application heat-generating catalyst carrier is used for purifying an exhaust gas while loading a catalyst thereon, since the current application heat-generating catalyst carrier exhibits a small amount of resistivity change due to temperature change, it is possible to perform heat generation stably due to current application.

When the honeycomb structure produced by one embodiment of the method for producing a honeycomb structure of the present invention is used as an current application heat-generating catalyst carrier, the current application heat-generating catalyst carrier may consist of the thus-produced honeycomb structure. In addition, the current application heat-generating catalyst carrier may be equipped with a constituting element other than the thus-produced honeycomb structure. Examples of the constituting element other than the honeycomb structure include an electrode for applying a voltage. In this case, the current application heat-generating catalyst carrier is equipped with the honeycomb structure and an electrode for applying a voltage to the honeycomb structure.

EXAMPLES

The method for producing a silicon carbide ceramic of the present invention will be described more specifically by Examples, but it should be understood that the present invention is not limited to or by these Examples.

Example 1

Silicon carbide powders having a content ratio of 4H—SiC silicon carbide crystals of 0.1 mass %, silicon carbide powders having a content ratio of 4H—SiC silicon carbide crystals of 26.0 mass %, and metal silicon powders were mixed at a mass ratio of 67.5:2.5:30.0. The silicon carbide powders are silicon carbide ceramic powders. Hydroxypropylmethyl cellulose as a binder, a water absorbing resin as a pore forming material, and water were added to the mixtures to prepare a forming raw material. The forming raw material thus prepared was kneaded by using a vacuum kneader machine to obtain a cylindrical kneaded clay. The silicon carbide powders and the metal silicon powders may be called (collectively) "ceramic raw material". In addition, the silicon carbide powders having a content ratio of 4H—SiC silicon carbide crystals of 0.1 mass % are "low 4H—SiC silicon carbide powders". And, the silicon carbide powders having a content ratio of 4H—SiC silicon carbide crystals of 26.0 mass % are "high 4H—SiC silicon carbide powders". The content amount of the binder was 7 parts by mass based on 100 parts by mass of the total amount of the ceramic raw material. Moreover, the content amount of the pore forming material was 3 parts by mass based on 100 parts by mass of the total amount of the ceramic raw material. Further, the content amount of water was 42 parts by mass based on 100 parts by mass of the total amount of the ceramic raw material. The average particle diameter of silicon carbide powders was 30 μm and the average particle diameter of the metal silicon powders was 6 μm. In addition, the average particle diameter of the pore forming material was 25 μm. The average particle diameter of each of the silicon carbide powders, metal silicon powders, and pore forming material were a value measured by a laser diffraction method.

The cylindrical kneaded clay thus obtained was formed by using an extruder to obtain a cylindrical honeycomb formed body. The honeycomb formed body thus obtained was subjected to high-frequency induction heat drying, followed by drying at 120° C. for 2 hours by using a hot air drier and then, a predetermined amount of both end portions was cut.

Thereafter, the honeycomb formed body was degreased, fired, and further subjected to oxidation treatment to obtain a honeycomb structure (silicon carbide ceramic). The degreasing condition was set at 550° C. for 3 hours. The firing condition was set at 1450° C. for 2 hours under an argon atmosphere. The oxidation treatment condition was set at 1300° C. for 1 hour. Nitrogen has not been dissolved in solid solution in the honeycomb structure thus obtained.

In the honeycomb structure thus obtained, an average pore diameter of partition wall was 15 μm and a porosity was 40%. The average pore diameter and porosity are values as measured using a mercury porosimeter. In addition, in the honeycomb structure, the thickness of the partition wall was 120 μm and the cell density was 90 cells/cm$^2$. Further, the bottom surface of the honeycomb structure was a circle with a diameter of 90 mm and the length of the honeycomb structure was 100 mm in the cell extending direction. The isostatic strength of the honeycomb structure thus obtained was 7 MPa. The isostatic strength is breaking strength measured while applying a hydrostatic pressure in water. The average particle diameter of the silicon carbide particles constituting the partition wall of the honeycomb structure was 30 μm. The average particle diameter of the silicon carbide particles constituting the partition wall of the honeycomb structure is a value determined by observing the cross-section of the silicon carbide ceramic with SEM and analyzing them by using an image processing apparatus.

The "resistivity ($R_{20}$, $R_{Min}$, $R_{20}-R_{Min}$)", "temperature to give the minimum resistivity ($T_{R-Min}$)", "stability at the time of current application", and "thermal resistance" of the honeycomb structure thus obtained were measured by the following methods, respectively. In addition, the ratio of crystal structures in the silicon carbide ceramic (honeycomb structure) was measured by the following method. The results are shown in Table 2.

In Table 2, the column of "crystal structure ratio (mass %)" showed the ratios (mass %) of respective crystal structures (4H—SiC silicon carbide crystals, 6H—SiC silicon carbide crystals, and the like) with respect to the total of silicon carbide crystals in the silicon carbide ceramic of the fired body. In addition, the column of an average particle diameter (μm) showed the average particle diameter (μm) of the silicon carbide particles in the silicon carbide ceramic. The average particle diameter of the silicon carbide particles in the silicon carbide ceramic is a value determined by observing the cross-section of the silicon carbide ceramic with SEM and analyzing it by using an image processing apparatus (ImageJ). In addition, the content ratio (mass %) of metal silicon shows a content ratio of the metal silicon with respect to the total of the silicon carbide particles and the metal silicon. The content ratio of the metal silicon is a value measured by using a fluorescent X-ray analysis. In addition, the porosity shows a porosity of the partition wall of the honeycomb structure made of the silicon carbide ceramic.

Moreover, in the column of "stability during current application" in Table 2, when the temperature distribution in the carrier was 50° C. or less during current application, it was evaluated as "A". And, when the temperature distribution in the carrier was 100° C. or less (and more than 50° C.) during current application, it was evaluated as "B". Further, when the temperature distribution in the carrier was more than 100° C. during current application, it was evaluated as "C". The term "temperature distribution in the carrier" in the "temperature distribution in the carrier was 50° C. or less" as used here means a difference between the maximum temperature and the minimum temperature in the carrier. The evaluation of "A" and "B" are both within the acceptable level. Moreover, in the column of "thermal resistance" in Table 2, when a transformation ratio of 3C—SiC silicon carbide crystals was 5% or less of the original one, it was evaluated as "A". And, when a transformation ratio of 3C—SiC silicon carbide crystals was 10% or less of the original one (and more than 5%), it was evaluated as "B". The evaluation of "A" and "B" are both within the acceptable level.

(Measurement of Resistivity)

From the honeycomb structure (silicon carbide ceramic), a 4 mm×2 mm×40 mm test piece was cut and resistance of it was measured using a four terminal method. The resistance was measured at 20° C. and then measured at each 100° C. from 100° C. to 800° C. The resistivity is calculated based on the resistance thus obtained.

(Measurement of Ratios of Crystal Structures)

A quantitative determination of the crystal polymorphic forms of silicon carbide was performed by using the X-ray diffraction method of a powder sample (method proposed by Ruska (J. Mater. Sci., 14, 2013-2017 (1979))).

(Temperature to Give the Minimum Resistivity)

In the "measurement of resistivity", the temperature at which the resistivity reaches the minimum value was designated as "temperature ($T_{R-Min}$) to give the minimum resistivity".

(Stability During Current Application)

Stability during current application was evaluated by measuring a temperature distribution in the carrier when current application was performed at a voltage of 600V by using a thermocouple (measuring the temperature at 39 positions uniformly scattered in the honeycomb structure) and determining a temperature distribution when the average temperature in the carrier reached 500° C.

(Thermal Resistance)

Thermal resistance was, similar to above test of "stability during current application", performed by applying a voltage of 600V until the average temperature in the carrier was reached 500° C., and then current application was stopped to cool the temperature to 50° C. after the average temperature reached to 500° C. This heating and cooling was regarded as 1 cycle, and a transformation ratio of 3C—SiC silicon carbide crystals after this heating and cooling cycle was repeated 100 times was found to evaluate. The transformation ratio of 3C—SiC silicon carbide crystals is a value obtained by subtracting the content ratio of 3C—SiC silicon carbide crystals after the thermal resistance test from the content ratio of 3C—SiC silicon carbide crystals before the thermal resistance test, dividing the difference by the content ratio of 3C—SiC silicon carbide crystals before the thermal resistance test, and then multiplying the value thus obtained by 100.

TABLE 1

| | low 4H-SiC silicon carbide powders | | | | | high 4H-SiC silicon carbide powders | | | | | | metal | pore forming material |
|---|---|---|---|---|---|---|---|---|---|---|---|---|---|
| | Content | Crystal structure ratio (mass %) | | | | Average particle | Content | Crystal structure ratio (mass %) | | | | Average particle | silicon Content | Content amount |
| | ratio (mass %) | 4H-SiC | 6H-SiC | 15R-SiC | 3C-SiC | diameter (μm) | ratio (mass %) | 4H-SiC | 6H-SiC | 15R-SiC | 3C-SiC | diameter (μm) | ratio (mass %) | (parts by mass) |
| Comp. Ex. 1 | 70.0 | 0.0 | 100.0 | 0.0 | 0.0 | 30 | 0.0 | 26.0 | 67.0 | 4.0 | 3.0 | 30 | 30 | 1.0 |
| Example 1 | 67.5 | 0.1 | 92.9 | 5.0 | 2.0 | 30 | 2.5 | 26.0 | 67.0 | 4.0 | 3.0 | 30 | 30 | 1.0 |
| Example 2 | 62.1 | 0.1 | 92.9 | 5.0 | 2.0 | 30 | 7.9 | 26.0 | 67.0 | 4.0 | 3.0 | 30 | 30 | 1.0 |
| Example 3 | 56.7 | 0.1 | 92.9 | 5.0 | 2.0 | 30 | 13.3 | 26.0 | 67.0 | 4.0 | 3.0 | 30 | 30 | 1.0 |
| Example 4 | 43.3 | 0.1 | 92.9 | 5.0 | 2.0 | 30 | 26.7 | 26.0 | 67.0 | 4.0 | 3.0 | 30 | 30 | 1.0 |
| Example 5 | 45.0 | 12.0 | 84.0 | 3.0 | 1.0 | 30 | 25.0 | 26.0 | 67.0 | 4.0 | 3.0 | 30 | 30 | 1.0 |
| Example 6 | 5.0 | 12.0 | 84.0 | 3.0 | 1.0 | 30 | 65.0 | 26.0 | 67.0 | 4.0 | 3.0 | 30 | 30 | 1.0 |
| Example 7 | 7.1 | 12.0 | 84.0 | 3.0 | 1.0 | 30 | 92.9 | 26.0 | 67.0 | 4.0 | 3.0 | 30 | 0 | 1.0 |
| Comp. Ex. 2 | 0.0 | 12.0 | 84.0 | 3.0 | 1.0 | 30 | 70.0 | 26.0 | 67.0 | 4.0 | 3.0 | 30 | 30 | 1.0 |
| Example 8 | 56.7 | 0.1 | 92.9 | 0.1 | 6.9 | 30 | 13.3 | 26.0 | 67.0 | 0.1 | 6.9 | 30 | 30 | 1.0 |
| Example 9 | 56.7 | 0.1 | 92.9 | 5.0 | 2.0 | 30 | 13.3 | 26.0 | 67.0 | 5.0 | 2.0 | 30 | 30 | 1.0 |
| Example 10 | 56.7 | 0.1 | 88.9 | 9.0 | 2.0 | 30 | 13.3 | 26.0 | 47.0 | 25.0 | 2.0 | 30 | 30 | 1.0 |
| Example 11 | 56.7 | 0.1 | 79.1 | 18.8 | 2.0 | 30 | 13.3 | 26.0 | 47.0 | 25.0 | 2.0 | 30 | 30 | 1.0 |
| Example 12 | 56.7 | 0.1 | 77.9 | 20.0 | 2.0 | 30 | 13.3 | 26.0 | 47.0 | 25.0 | 2.0 | 30 | 30 | 1.0 |
| Example 13 | 56.7 | 0.1 | 92.9 | 5.0 | 2.0 | 30 | 13.3 | 26.0 | 62.0 | 5.0 | 7.0 | 30 | 30 | 1.0 |
| Example 14 | 56.7 | 0.1 | 92.9 | 5.0 | 2.0 | 30 | 13.3 | 26.0 | 51.0 | 5.0 | 18.0 | 30 | 30 | 1.0 |
| Example 15 | 56.7 | 0.1 | 92.9 | 5.0 | 2.0 | 30 | 13.3 | 26.0 | 51.0 | 5.0 | 23.0 | 30 | 30 | 1.0 |
| Example 16 | 5.0 | 12.0 | 47.0 | 3.0 | 38.0 | 30 | 65.0 | 26.0 | 50.2 | 21.3 | 2.5 | 30 | 30 | 1.0 |
| Example 17 | 56.7 | 0.1 | 92.9 | 5.0 | 2.0 | 30 | 13.3 | 26.0 | 67.0 | 4.0 | 3.0 | 30 | 30 | 0.2 |
| Example 18 | 56.7 | 0.1 | 92.9 | 5.0 | 2.0 | 30 | 13.3 | 26.0 | 67.0 | 4.0 | 3.0 | 30 | 30 | 0.3 |
| Example 19 | 56.7 | 0.1 | 92.9 | 5.0 | 2.0 | 30 | 13.3 | 26.0 | 67.0 | 4.0 | 3.0 | 30 | 30 | 0.5 |
| Example 20 | 56.7 | 0.1 | 92.9 | 5.0 | 2.0 | 30 | 13.3 | 26.0 | 67.0 | 4.0 | 3.0 | 30 | 30 | 1.5 |
| Example 21 | 56.7 | 0.1 | 92.9 | 5.0 | 2.0 | 30 | 13.3 | 26.0 | 67.0 | 4.0 | 3.0 | 30 | 30 | 2.0 |
| Example 22 | 56.7 | 0.1 | 92.9 | 5.0 | 2.0 | 30 | 13.3 | 26.0 | 67.0 | 4.0 | 3.0 | 30 | 30 | 2.1 |
| Example 23 | 56.7 | 0.1 | 92.9 | 5.0 | 2.0 | 30 | 13.3 | 26.0 | 67.0 | 4.0 | 3.0 | 30 | 30 | 4.0 |
| Example 24 | 56.7 | 0.1 | 92.9 | 5.0 | 2.0 | 30 | 13.3 | 26.0 | 67.0 | 4.0 | 3.0 | 30 | 30 | 4.3 |
| Example 25 | 56.7 | 0.1 | 92.9 | 5.0 | 2.0 | 7 | 13.3 | 26.0 | 67.0 | 4.0 | 3.0 | 7 | 30 | 1.0 |
| Example 26 | 56.7 | 0.1 | 92.9 | 5.0 | 2.0 | 9 | 13.3 | 26.0 | 67.0 | 4.0 | 3.0 | 9 | 30 | 1.0 |
| Example 27 | 56.7 | 0.1 | 92.9 | 5.0 | 2.0 | 10 | 13.3 | 26.0 | 67.0 | 4.0 | 3.0 | 10 | 30 | 1.0 |
| Example 28 | 56.7 | 0.1 | 92.9 | 5.0 | 2.0 | 15 | 13.3 | 26.0 | 67.0 | 4.0 | 3.0 | 15 | 30 | 1.0 |
| Example 29 | 56.7 | 0.1 | 92.9 | 5.0 | 2.0 | 35 | 13.3 | 26.0 | 67.0 | 4.0 | 3.0 | 35 | 30 | 1.0 |
| Example 30 | 56.7 | 0.1 | 92.9 | 5.0 | 2.0 | 50 | 13.3 | 26.0 | 67.0 | 4.0 | 3.0 | 50 | 30 | 1.0 |
| Example 31 | 56.7 | 0.1 | 92.9 | 5.0 | 2.0 | 51 | 13.3 | 26.0 | 67.0 | 4.0 | 3.0 | 51 | 30 | 1.0 |

TABLE 2

| | Silicon carbide ceramic | | | | Average particle diameter (μm) | Metal silicon Content ratio (mass %) | Porosity (%) | $R_{20}$ (Ω·cm) | $R_{Min}$ (Ω·cm) | $R_{20} - R_{Min}$ (Ω·cm) | $T_{R-Min}$ (°C.) | Stability during current application | Thermal resistance |
|---|---|---|---|---|---|---|---|---|---|---|---|---|---|
| | Crystal structure ratio (mass %) | | | | | | | | | | | | |
| | 4H-SiC | 6H-SiC | 15R-SiC | 3C-SiC | | | | | | | | | |
| Comp. Ex. 1 | 0.0 | 100 | 0.0 | 0.0 | 30 | 30 | 40 | 200 | 20 | 180 | 800 | A | A |
| Example 1 | 1.0 | 92.0 | 5.0 | 2.0 | 30 | 30 | 40 | 60 | 25 | 35 | 450 | A | A |
| Example 2 | 3.0 | 90.0 | 4.9 | 2.1 | 30 | 30 | 40 | 55 | 21 | 34 | 425 | A | A |
| Example 3 | 5.0 | 88.0 | 4.8 | 2.2 | 30 | 30 | 40 | 40 | 15 | 25 | 400 | A | A |
| Example 4 | 10.0 | 83.0 | 4.6 | 2.4 | 30 | 30 | 40 | 25 | 10 | 15 | 390 | A | A |
| Example 5 | 17.0 | 77.9 | 3.4 | 1.7 | 30 | 30 | 40 | 7 | 3 | 4 | 370 | A | A |
| Example 6 | 25.0 | 68.2 | 3.9 | 2.9 | 30 | 30 | 40 | 2.5 | 1.2 | 1.3 | 360 | A | A |
| Example 7 | 25.0 | 68.2 | 3.9 | 2.9 | 30 | 0 | 40 | 5 | 2 | 3 | 350 | A | A |
| Comp. Ex. 2 | 26.0 | 67.0 | 4.0 | 3.0 | 30 | 30 | 40 | 0.5 | 0.1 | 0.4 | 330 | A | A |
| Example 8 | 5.0 | 88.0 | 0.1 | 6.9 | 30 | 30 | 40 | 45 | 22 | 23 | 370 | A | B |
| Example 9 | 5.0 | 88.0 | 5.0 | 2.0 | 30 | 30 | 40 | 41 | 16 | 25 | 400 | A | A |
| Example 10 | 5.0 | 80.9 | 12.0 | 2.0 | 30 | 30 | 40 | 44 | 22 | 22 | 405 | A | A |
| Example 11 | 5.0 | 73.0 | 20.0 | 2.0 | 30 | 30 | 40 | 43 | 18 | 25 | 430 | A | A |
| Example 12 | 5.0 | 72.0 | 21.0 | 2.0 | 30 | 30 | 40 | 41 | 12 | 29 | 450 | B | A |
| Example 13 | 5.0 | 87.0 | 5.0 | 3.0 | 30 | 30 | 40 | 42 | 16 | 26 | 400 | A | A |
| Example 14 | 5.0 | 84.9 | 5.0 | 5.0 | 30 | 30 | 40 | 39 | 15 | 24 | 400 | A | A |
| Example 15 | 5.0 | 84.9 | 5.0 | 6.0 | 30 | 30 | 40 | 38 | 13 | 25 | 400 | A | B |
| Example 16 | 25.0 | 50.0 | 20.0 | 5.0 | 30 | 30 | 40 | 2 | 1 | 1 | 350 | A | A |
| Example 17 | 5.0 | 88.0 | 4.8 | 2.2 | 30 | 30 | 29 | 10 | 4 | 6 | 400 | A | A |
| Example 18 | 5.0 | 88.0 | 4.8 | 2.2 | 30 | 30 | 30 | 20 | 11 | 9 | 400 | A | A |
| Example 19 | 5.0 | 88.0 | 4.8 | 2.2 | 30 | 30 | 35 | 30 | 13 | 17 | 400 | A | A |
| Example 20 | 5.0 | 88.0 | 4.8 | 2.2 | 30 | 30 | 45 | 60 | 25 | 35 | 400 | A | A |
| Example 21 | 5.0 | 88.0 | 4.8 | 2.2 | 30 | 30 | 50 | 100 | 40 | 60 | 400 | A | A |
| Example 22 | 5.0 | 88.0 | 4.8 | 2.2 | 30 | 30 | 51 | 150 | 70 | 80 | 400 | A | A |
| Example 23 | 0.1 | 92.9 | 5.0 | 2.0 | 30 | 30 | 65 | 200 | 110 | 90 | 500 | A | A |
| Example 24 | 0.1 | 92.9 | 5.0 | 2.0 | 30 | 30 | 66 | 270 | 160 | 110 | 500 | A | A |
| Example 25 | 5.0 | 88.0 | 4.8 | 2.2 | 7 | 30 | 66 | 250 | 150 | 100 | 400 | A | A |
| Example 26 | 5.0 | 88.0 | 4.8 | 2.2 | 9 | 30 | 51 | 200 | 120 | 80 | 400 | A | A |
| Example 27 | 5.0 | 88.0 | 4.8 | 2.2 | 10 | 30 | 46 | 70 | 30 | 40 | 400 | A | A |
| Example 28 | 5.0 | 88.0 | 4.8 | 2.2 | 15 | 30 | 42 | 62 | 23 | 39 | 400 | A | A |
| Example 29 | 5.0 | 88.0 | 4.8 | 2.2 | 35 | 30 | 38 | 36 | 15 | 21 | 400 | A | A |
| Example 30 | 5.0 | 88.0 | 4.8 | 2.2 | 50 | 30 | 34 | 27 | 8 | 19 | 400 | A | A |
| Example 31 | 5.0 | 88.0 | 4.8 | 2.2 | 51 | 30 | 33 | 25 | 12 | 13 | 400 | A | A |

Examples 2 to 31

Comparative Examples 1 and 2

In a manner similar to Example 1 except that some of the production conditions were changed as shown in Table 1, honeycomb structures (silicon carbide ceramics) were produced. The "resistivity" of the honeycomb structures thus obtained was measured by the above-described method. The results are shown in Table 2. Incidentally, in Table 1, the column of "content ratio (mass %)" of "low 4H—SiC silicon carbide powders" showed the content ratio of "low 4H—SiC silicon carbide powders" with respect to the total of the whole silicon carbide powders and metal silicon. In addition, the column of "content ratio (mass %)" of "high 4H—SiC silicon carbide powders" showed the content ratio of "high 4H—SiC silicon carbide powders" with respect to the total of the whole silicon carbide powders and metal silicon. The column of "crystal structure ratio (mass %)" of "low 4H—SiC silicon carbide powders" showed the ratio (mass %) of each of the crystal structures (4H—SiC silicon carbide crystals, 6H—SiC silicon carbide crystals and the like) with respect to the total amount of the silicon carbide crystals in the low 4H—SiC silicon carbide powders. In addition, the column of "crystal structure ratio (mass %)" of "high 4H—SiC silicon carbide powders" showed the ratio (mass %) of each of the crystal structures (4H—SiC silicon carbide crystals, 6H—SiC silicon carbide crystals and the like) with respect to the total amount of the silicon carbide crystals in the high 4H—SiC silicon carbide powders. The content ratio (mass %) of the metal silicon showed a content ratio of the metal silicon with respect to the total amount of the whole silicon carbide powders and the metal silicon. In addition, the content amount of the pore forming material is indicated by a content ratio (part by mass) based on 100 parts by mass of the "total amount of the whole silicon carbide powders and the metal silicon".

It has been found from Table 1 and Table 2 that a silicon carbide ceramic (honeycomb structure) being adjusted at a content ratio of 4H—SiC silicon carbide crystals to a desired value can be obtained by the methods for producing a silicon carbide ceramic in Examples 1 to 31. And, it has also been found that by adjusting the content ratio of 4H—SiC silicon carbide crystals to a desired value, a silicon carbide ceramic (honeycomb structure) exhibiting a small difference ($R_{20} - R_{Min}$) between the resistivity at 20° C. ($R_{20}$) and the minimum resistivity ($R_{Min}$) and having a small resistivity change depending on temperature can be obtained. On the other hand, in the method for producing a silicon carbide ceramic in Comparative Example 1, only one kind of silicon carbide ceramic powders are used as the raw material and further, the silicon carbide ceramic powders do not contain 4H—SiC silicon carbide crystals. Therefore, it has been found that in the silicon carbide ceramic (honeycomb structure) thus obtained, $R_{20} - R_{Min}$ is large and a temperature change in resistivity is small. In addition, it has also been found that in the silicon carbide ceramic (honeycomb structure) thus obtained, the temperature to give the minimum resistivity is high. Moreover, since the method for producing a silicon carbide ceramic in Comparative Example 2 uses only one kind of silicon carbide ceramic powders as the raw material, the content ratio of 4H—SiC silicon carbide crystals has not been adjusted to a desired value. Thus, in the silicon carbide ceramic produced by the method for producing a silicon carbide ceramic in Comparative Example 2, it has been considered that the one has a small resistivity at 20° C. ($R_{20}$) because content ratio of 4H—SiC silicon carbide crystals is excessively large. And therefore, it has been considered that the silicon carbide ceramic obtained by the method for producing a silicon carbide ceramic in Comparative Example 2 is less effective for generating heat by current application.

INDUSTRIAL APPLICABILITY

The method for producing a silicon carbide ceramic of the present invention is utilized for producing a silicon carbide ceramic capable of using it as a heating element. In addition, the method for producing a honeycomb structure of the present invention is utilized for producing a catalyst carrier for exhaust gas purifying apparatus for purifying an exhaust gas of automobiles.

DESCRIPTION OF REFERENCE NUMERALS

1: Partition wall
2: Cell
3: Outer Peripheral wall
11: One end face
12: Another end face
100: Honeycomb structure

The invention claimed is:

1. A method for producing a silicon carbide ceramic comprising:
a forming raw material preparing step of mixing a plurality of silicon carbide ceramic powders containing 4H—SiC silicon carbide crystals at respectively different content ratios to prepare a forming raw material;
a forming step of forming the forming raw material to form a formed body; and
a firing step of firing the formed body to produce a silicon carbide ceramic being adjusted at a content ratio of 4H—SiC silicon carbide crystal to a desired value.

2. A method for producing a silicon carbide ceramic according to claim 1, wherein:
the plurality of silicon carbide ceramic powders are composed of low 4H—SiC silicon carbide ceramic powders being silicon carbide ceramic powders having a smaller content ratio of 4H—SiC silicon carbide crystal compared with the content ratio of 4H—SiC silicon carbide crystals in silicon carbide crystals in a silicon carbide ceramic to be produced and high 4H—SiC silicon carbide ceramic powders being silicon carbide ceramic powders having a larger content ratio of 4H—SiC silicon carbide crystal content compared with the content ratio of 4H—SiC silicon carbide crystals in the silicon carbide crystals in the silicon carbide ceramic to be produced; wherein
the content ratio of the 4H—SiC silicon carbide crystals in the silicon carbide crystals in the low 4H—SiC silicon carbide ceramic powders is 0.01 to 15 mass %; and
the content ratio of the 4H—SiC silicon carbide crystals in the silicon carbide crystals in the high 4H—SiC silicon carbide ceramic powders is 0.5 to 40 mass %.

3. A method for producing a silicon carbide ceramic according to claim 2, wherein a difference between the content ratio of the 4H—SiC silicon carbide crystals in the silicon carbide crystals in the low 4H—SiC silicon carbide ceramic powders and the content ratio of the 4H—SiC silicon carbide crystals in the silicon carbide crystals in the high 4H—SiC silicon carbide ceramic powders is 5 to 30 mass %.

4. A method for producing a silicon carbide ceramic according to claim 3, wherein the silicon carbide ceramic to be produced contains 0.1 to 25 mass % of 4H—SiC silicon carbide crystals and 50 to 99.9 mass % of 6H—SiC silicon carbide crystals in the silicon carbide crystals.

5. A method for producing a silicon carbide ceramic according to claim 4, wherein:
metal silicon powders are contained in the forming raw material; and
the silicon carbide ceramic to be produced contains a plurality of silicon carbide particles and silicon for binding the silicon carbide particles to each other.

6. A method for producing a silicon carbide ceramic according to claim 3, wherein:
metal silicon powders are contained in the forming raw material; and
the silicon carbide ceramic to be produced contains a plurality of silicon carbide particles and silicon for binding the silicon carbide particles to each other.

7. A method for producing a silicon carbide ceramic according to claim 2, wherein the silicon carbide ceramic to be produced contains 0.1 to 25 mass % of 4H—SiC silicon carbide crystals and 50 to 99.9 mass % of 6H—SiC silicon carbide crystals in the silicon carbide crystals.

8. A method for producing a silicon carbide ceramic according to claim 7, wherein:
metal silicon powders are contained in the forming raw material; and
the silicon carbide ceramic to be produced contains a plurality of silicon carbide particles and silicon for binding the silicon carbide particles to each other.

9. A method for producing a silicon carbide ceramic according to claim 2, wherein:
metal silicon powders are contained in the forming raw material; and
the silicon carbide ceramic to be produced contains a plurality of silicon carbide particles and silicon for binding the silicon carbide particles to each other.

10. A method for producing a silicon carbide ceramic according to claim 1, wherein the silicon carbide ceramic to be produced contains 0.1 to 25 mass % of 4H—SiC silicon carbide crystals and 50 to 99.9 mass % of 6H—SiC silicon carbide crystals in the silicon carbide crystals.

11. A method for producing a silicon carbide ceramic according to claim 10, wherein:
metal silicon powders are contained in the forming raw material; and
the silicon carbide ceramic to be produced contains a plurality of silicon carbide particles and silicon for binding the silicon carbide particles to each other.

12. A method for producing a silicon carbide ceramic according to claim 1, wherein a content amount of a nitrogen in the silicon carbide ceramic to be produced is 0.01 mass % or less.

13. A method for producing a silicon carbide ceramic according to claim 12, wherein:
metal silicon powders are contained in the forming raw material; and
the silicon carbide ceramic to be produced contains a plurality of silicon carbide particles and silicon for binding the silicon carbide particles to each other.

14. A method for producing a silicon carbide ceramic according to claim 1, wherein:
   metal silicon powders are contained in the forming raw material; and
   the silicon carbide ceramic to be produced contains a plurality of silicon carbide particles and silicon for binding the silicon carbide particles to each other.

15. A method for producing a silicon carbide ceramic according to claim 14, wherein an average particle diameter of the silicon carbide particles is 10 to 50 μm.

16. A method for producing a silicon carbide ceramic according to claim 1, wherein a porosity of the silicon carbide ceramic to be produced is 30 to 65%.

17. A method for producing a honeycomb structure comprising:
   a forming raw material preparing step of mixing a plurality of silicon carbide ceramic powders containing 4H—SiC silicon carbide crystals at respectively different content ratios to prepare a forming raw material;
   a forming step of forming the forming raw material into a honeycomb formed body; and
   a firing step of firing the honeycomb formed body to produce a silicon carbide ceramic honeycomb structure being adjusted at a content ratio of 4H—SiC silicon carbide crystal to a desired value.

* * * * *